(12) United States Patent
Li

(10) Patent No.: US 6,510,866 B2
(45) Date of Patent: Jan. 28, 2003

(54) BALL COCK ASSEMBLY, FLOAT ASSEMBLY FOR SAME, AND METHOD OF CONTROLLING LIQUID LEVEL IN A TANK

(75) Inventor: Feiyu Li, Xiamen (CN)

(73) Assignee: WDI International, Inc., Bedford Heights, OH (US)

( * ) Notice: Subject to any disclaimer, the term of this patent is extended or adjusted under 35 U.S.C. 154(b) by 0 days.

(21) Appl. No.: 09/817,839

(22) Filed: Mar. 26, 2001

(65) Prior Publication Data

US 2002/0134432 A1 Sep. 26, 2002

(51) Int. Cl.[7] ............... F16K 31/34; F16K 31/26; F16K 47/08
(52) U.S. Cl. ............ 137/426; 137/2; 137/414; 137/416; 137/439; 137/436; 137/444
(58) Field of Search ................. 137/414, 426, 137/436, 2, 416, 429, 432, 433, 434, 442, 443, 444

(56) References Cited

U.S. PATENT DOCUMENTS

| | | | | |
|---|---|---|---|---|
| 2,911,000 A | * | 11/1959 | Doyle | 137/432 |
| 3,194,070 A | * | 7/1965 | Grant | 137/432 |
| 3,285,277 A | * | 11/1966 | Goldtrap | 137/414 |
| 3,429,333 A | * | 2/1969 | Schoepe et al. | 137/414 |
| 3,693,649 A | * | 9/1972 | Gordon et al. | 137/432 |
| 3,853,141 A | * | 12/1974 | Fischer | 137/436 |
| 4,080,986 A | * | 3/1978 | Schoepe | 137/426 |
| 4,100,928 A | | 7/1978 | Shoepe | |
| 4,108,202 A | | 8/1978 | Shoepe | |
| 4,182,364 A | | 1/1980 | Gilbert et al. | |
| 4,286,619 A | * | 9/1981 | Straus | 137/426 |
| 4,338,964 A | * | 7/1982 | Schoepe | 137/426 |
| 4,573,495 A | * | 3/1986 | Rothe et al. | 137/426 |
| 4,600,031 A | * | 7/1986 | Nestich | 137/426 |
| 4,703,653 A | | 11/1987 | Shoepe et al. | |
| 4,765,363 A | * | 8/1988 | Pi-Yu | 137/414 |
| 4,887,635 A | * | 12/1989 | Johnson | 137/426 |
| 5,421,361 A | * | 6/1995 | Johnson | 137/414 |
| 5,715,859 A | * | 2/1998 | Nichols-Roy | 137/414 |
| 5,738,141 A | * | 4/1998 | Blanke et al. | 137/414 |
| 5,904,176 A | | 5/1999 | Li | |
| 5,964,247 A | * | 10/1999 | Johnson | 137/426 |
| 6,450,195 B1 | * | 9/2002 | Gil | 137/426 |

* cited by examiner

Primary Examiner—George L. Walton
(74) Attorney, Agent, or Firm—Howard M. Cohn

(57) ABSTRACT

A float assembly for a ball cock assembly for a flush tank of a toilet includes an inner float component which is a buoyant element operatively connected to a shutoff valve atop a standpipe supplying water to the tank. The inner float component is disposed in an outer float component which is in the general form of a container disposed within the flush tank so that its top edge is at a selected water level. In the tank-filling portion of a flush cycle, when the water rises to the selected level, the outer float component suddenly becomes filled with water, causing the inner float element to abruptly rise, shutting off the flow of water into the flush tank. In this manner, the buoyant element is caused to rise at a rate which is greater than a rate at which the water is rising in the tank. The bottom of the outer float component is provided with a one-way valve so that, at the beginning of a flush cycle, when the water level drops to below the outer float component, water drains out of the outer float component. Water level again rises, the one-way valve, which itself is buoyant, closes. According to a feature of the invention, a connecting rod connecting the inner float component to a shutoff valve actuating arm is provided with two flat surfaces so that it may easily be installed and so that the position at which it links to the inner float component can easily be adjusted. According to another feature of the invention, an anti-siphon valve is disposed in a bottom portion of the standpipe to prevent water from draining out of the flush tank if there is a loss of pressure in the line supplying water to the flush tank.

14 Claims, 5 Drawing Sheets

BALL COCK ASSEMBLY, FLOAT ASSEMBLY FOR SAME, AND METHOD OF CONTROLLING LIQUID LEVEL IN A TANK

TECHNICAL FIELD OF THE INVENTION

The invention relates to a ball cock assembly of the type used for the control of liquid levels in tanks. More specifically, the invention relates to an improved float assembly for a ball cock assembly for controlling water level in a flush tank of a toilet.

BACKGROUND OF THE INVENTION

A typical ball cock assembly, such as used in the flush tank of a toilet, includes a riser (or standpipe) connected to the water supply and a float-operated shutoff valve that controls the level of water in the flush tank. In a typical flush cycle, when the tank is flushed, a flush valve at the bottom of the tank opens and water empties (drains) rapidly from the tank. The float drops (descends) and the shutoff valve opens, allowing water to flow into the tank (meanwhile, the flush valve becomes closed). As the water level in the tank rises, the float rises until, at a given level, the shutoff valve closes. Then the tank is ready for another flush cycle. A typical ball cock assembly also includes means for preventing back flow of water from the flush tank to the supply line in the event of a total or substantial drop in the pressure of the incoming water.

Toilet flush tanks have different dimensions, particularly heights, which requires using risers of different heights. Examples of ball cock assemblies including an adjustable-height riser having telescopically adjustable concentric inlet and outlet tubes can be found in U.S. Pat. No. 4,100,928, U.S. Pat. No. 4,108,202, and U.S. Pat. No. 4,182,364, each of which is incorporated in its entirety by reference herein.

An exemplary float-controlled ball cock assembly is shown in commonly-owned U.S. Pat. No. 5,904,176, entitled SILENT VALVE BALL COCK ASSEMBLY, which is incorporated in its entirety by reference herein.

A number of float assemblies are known for use with risers, including adjustable risers. The float itself may be as simple as a buoyant element such as a watertight (air-filled) ball at the end of an elongate arm extending in a cantilever manner (e.g., generally horizontally) from the shutoff valve. The water level at which the shutoff valve will close can be adjusted simply by bending the elongate arm. It is also known to have an adjustment screw at the shutoff valve end of the elongate arm to effect water level adjustment. Setting a desired water level in the tank with such a float assembly is largely a process of trial and error, requiring repeated iterations of adjustment, flushing, waiting for the flush tank to fill and for the shutoff valve to shut, and examining the resulting water level.

In another type of float assembly, a buoyant element, such as a watertight donut (torus) is disposed around the standpipe and is connected via a substantially vertical connecting rod to an end of an the shutoff valve actuating arm (lever) extending from the shutoff valve. Another example of a float valve assembly may be found in U.S. Pat. No. 4,703,653 which is incorporated in its entirety by reference herein.

It is desirable that the water level in a flush tank can easily and precisely be adjusted. It is therefore inherently desirable that float assembly operate in a manner which can repeatedly cause the shutoff valve to close when a given (pre-selected) water level is attained in the flush tank. It is also desirable that a float assembly be inexpensive to manufacture, and easy to replace. It is also desirable that a replacement float assembly can be easily and precisely adjusted.

OBJECTS AND SUMMARY OF THE INVENTION

It is an object of the present invention to provide a ball cock assembly as defined in one or more of the appended claims and, as such having the capability of being constructed to accomplish one or more of the following subsidiary objects.

One object of the present invention is to provide a novel float assembly for use with a ball cock assembly.

Another object is to provide an improved anti-siphoning feature in a ball cock assembly.

These and other objects, which will become evident upon a full reading of the description, are achieved in the manner to be more fully described by reference to the drawings and detailed discussion which follows.

According to the invention a float assembly for a ball cock assembly for a flush tank of a toilet comprises an inner float component which is a buoyant element operatively connected to a shutoff valve atop a standpipe supplying water to the tank.

The inner float component is disposed in an outer float component which is in the general form of a container disposed within the flush tank so that its top edge is at a selected water level.

In the tank-filling portion of a flush cycle, when the water rises to the selected level, the outer float component suddenly becomes filled with water, causing the inner float element to abruptly rise, shutting off the flow of water into the flush tank.

In this manner, the buoyant element is caused to rise at a rate which is greater than a rate at which the water is rising in the tank.

The bottom of the outer float component is provided with a one-way valve so that, at the beginning of a flush cycle, when the water level drops to below the outer float component, water can drain out of the outer float component. When the water level again rises, the one-way valve, which itself is buoyant, closes.

According to a feature of the invention, a connecting rod connecting the inner float component to a shutoff valve actuating arm is provided with two flat surfaces so that it may easily be installed and so that the position at which it links to the inner float component can easily be adjusted.

According to a feature of the invention, an anti-siphon valve is disposed in a bottom portion of the standpipe to prevent water from draining out of the flush tank if there is a loss of pressure in the line supplying water to the flush tank.

BRIEF DESCRIPTION OF THE DRAWINGS

As shown in the drawings, wherein like reference numerals designate like or corresponding parts throughout the several FIGS.

DETAILED DESCRIPTION OF THE INVENTION

Figure 1:
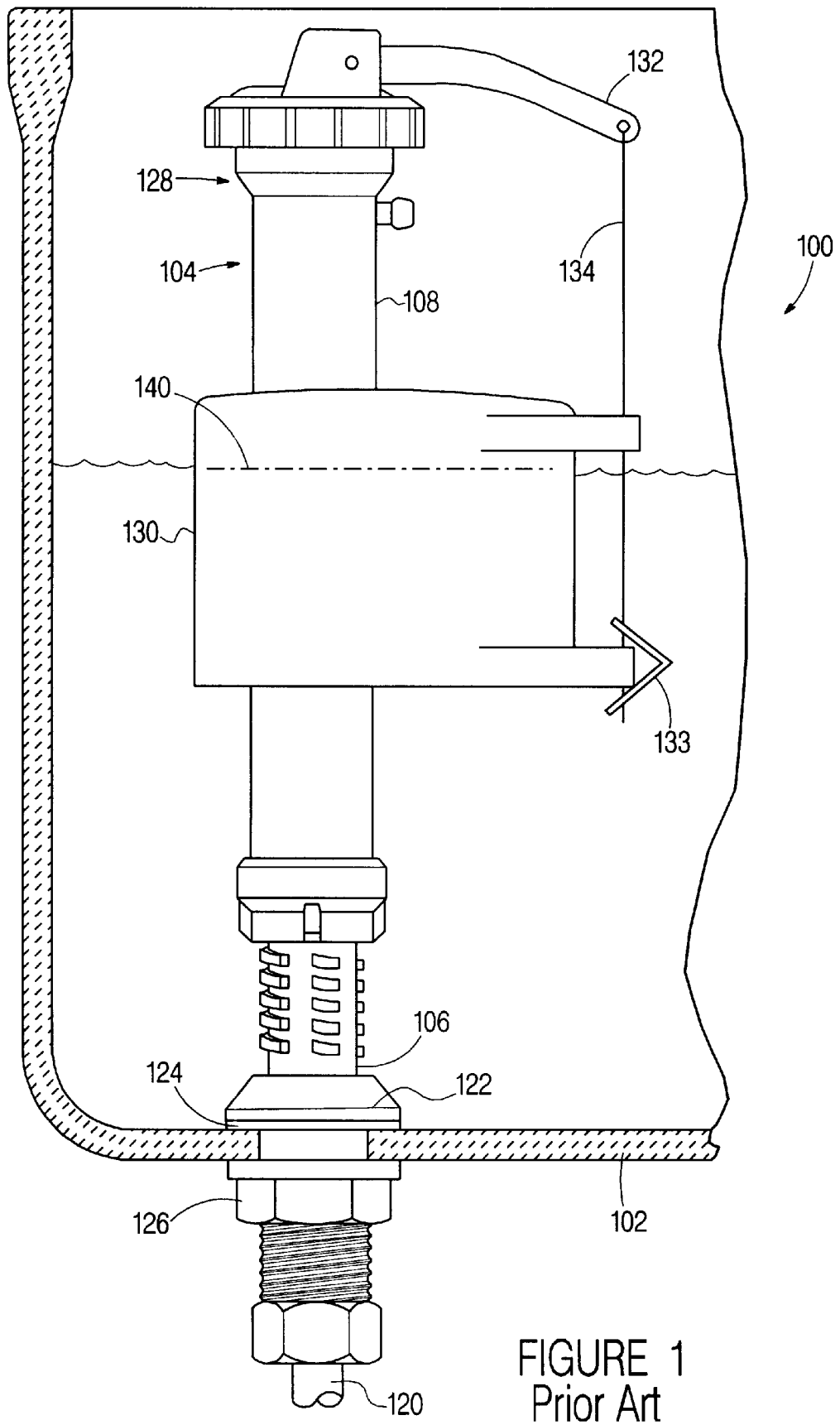
FIG. 1 is a side view of a complete ball cock assembly in a flush tank of a toilet, the flush tank being shown in partial cross-section, according to the prior art.

FIG. 1 corresponds to FIG. 1 of the aforementioned U.S. Pat. No. 5,904,176, and shows a ball cock valve assembly 100 disposed (as it would be installed) in a conventional toilet water flush tank 102. The ball cock assembly 100 includes an adjustable riser 104 comprising a lower tube 106 and a upper tube 108 which is concentric with the lower tube 106. The height of the riser 104 can be telescopically adjusted (longer or shorter), in a conventional manner. A water supply line 120 delivers water, under pressure, into the bottom of the lower tube 106. The lower tube 106 is secured and sealed to the flush tank 102 by a flange 122, resilient gasket 124 and flange nut 126, as illustrated.

A shutoff valve 128 is disposed atop the riser 104. A float 130 is disposed around the upper tube 108 of the the riser 104. A valve-actuating arm (lever) 132 extends generally horizontally from the shutoff valve 128. A connecting rod 134 extends between the float 130 and the distal (from the shutoff valve 128) end of the actuating arm 132. Adjustments of water level in the flush tank 102 may be accomplished by selective adjustment of the float 130 along the connecting rod 134 using conventional means, such as spring clip 133.

Water is discharged from the flush tank 102 by a separate flush valve (not shown) in the bottom of the flush tank, which is normally operated by a lever or button mounted to the exterior of the tank.

When the water is discharged from the tank 102, the float 130 goes down (descends), thereby opening the shutoff valve 128 to refill the tank 102. As the tank fills, the float rises. This pushes up on the distal end of the arm 132, via the rod 134. When the tank is filled to a given level, such as is shown in FIG. 1, the shutoff valve 128 closes and no more water flows into the tank. This is descriptive of a "flush cycle".

What has been described hereinabove, with respect to FIG. 1 is, for purposes of the present invention, entirely conventional and illustrative of the overall context in which a ball cock valve assembly 100 may operate in an illustrative toilet setting. In the main hereinafter, a ball cock assembly for a toilet flush tank is discussed.

For purposes of this discussion, the "height" of the float (buoyant element) 130 is defined as the height of its "waterline" 140 above the bottom of the flush tank. The top of the float is always above its "waterline". The "waterline" of a buoyant element is defined as the level of the water in which the element is floating, when it is immersed in the water and free to float. The height of the water (water level) in the flush tank 102 can also be measured from the bottom of the flush tank. As illustrated in FIG. 1, the float 130 is floating, hence its waterline 140 is at the same height as the water level.

The water level in the flush tank ranges from 0 (zero) when the tank is empty (such as at the beginning of a flush cycle), to maximum when the tank has re-filled and the shutoff valve shuts. In a typical toilet flush tank, this may be a range of approximately 12 inches, or approximately 30 centimeters (cm). In contrast thereto, a range of heights for the float is relatively restricted. For example, the float can only drop (descend) so far, and further vertical descent of the float is restricted by the fact that it is connected (e.g., via the connecting rod 134) to the valve-actuating arm (e.g., 132). Likewise, the float can only rise (ascend) so far, further vertical ascent of the float being similarly restricted by the mechanism of the rod 134 and arm 132.

Figure 1A:
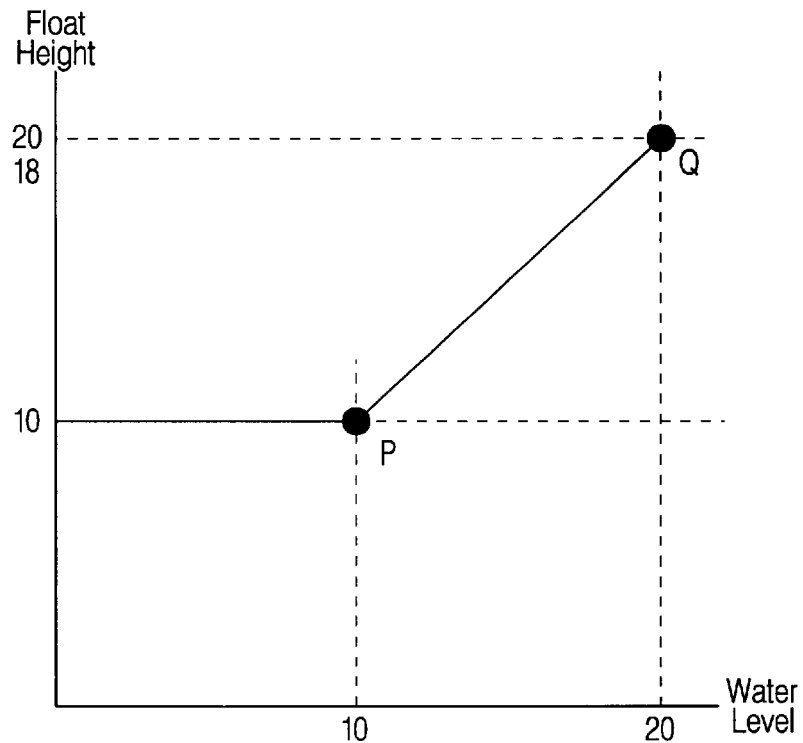
FIG. 1A is a graph illustrating the operation a buoyant element of a float assembly of a ball cock assembly of the prior art.

FIG. 1A is a graph illustrating an exemplary relationship between water level (X-axis) and float height (Y-axis) such as would be manifest with a prior art float assembly operating a shutoff valve, such as described hereinabove with respect to FIG. 1. It should be understood that the measurements and dimensions set forth herein are merely exemplary, and are taken from the bottom of the flush tank 102.

The maximum and minimum excursions of the float 130 are limited by the mechanism (e.g., of the rod 134 and the arm 132) connecting the float with the shutoff valve (e.g., 128), as described hereinabove. In this example, it is assumed that the float can descend only to 10 cm. and that the float can rise only to 20 cm. When the float has risen to the top of its range of movement, the shutoff valve closes.

When the water level drops below 10 cm, the float remains at 10 cm. This would be the situation immediately after commencing a flush cycle, when the water is drained from the flush tank. When the water level rises to 10 cm, the float begins to be buoyant (to float). This is indicated by the point "P". As the water level rises above 10 cm, the float rises in concert with the water level. When the water level and float have risen to 20 cm, the shutoff valve closes (and the float generally can not rise any further). This is indicated by the point "Q". It is therefore evident that, within its working range of movement (between 10 cm and 20 cm), the float 130 rises at the same rate as the water level, in a 1:1 linear relationship therewith (slope of 1). In other words, when the water rises 1 cm, for example from 15 cm to 16 cm, the float 30 will also rise 1 cm.

Figure 2:
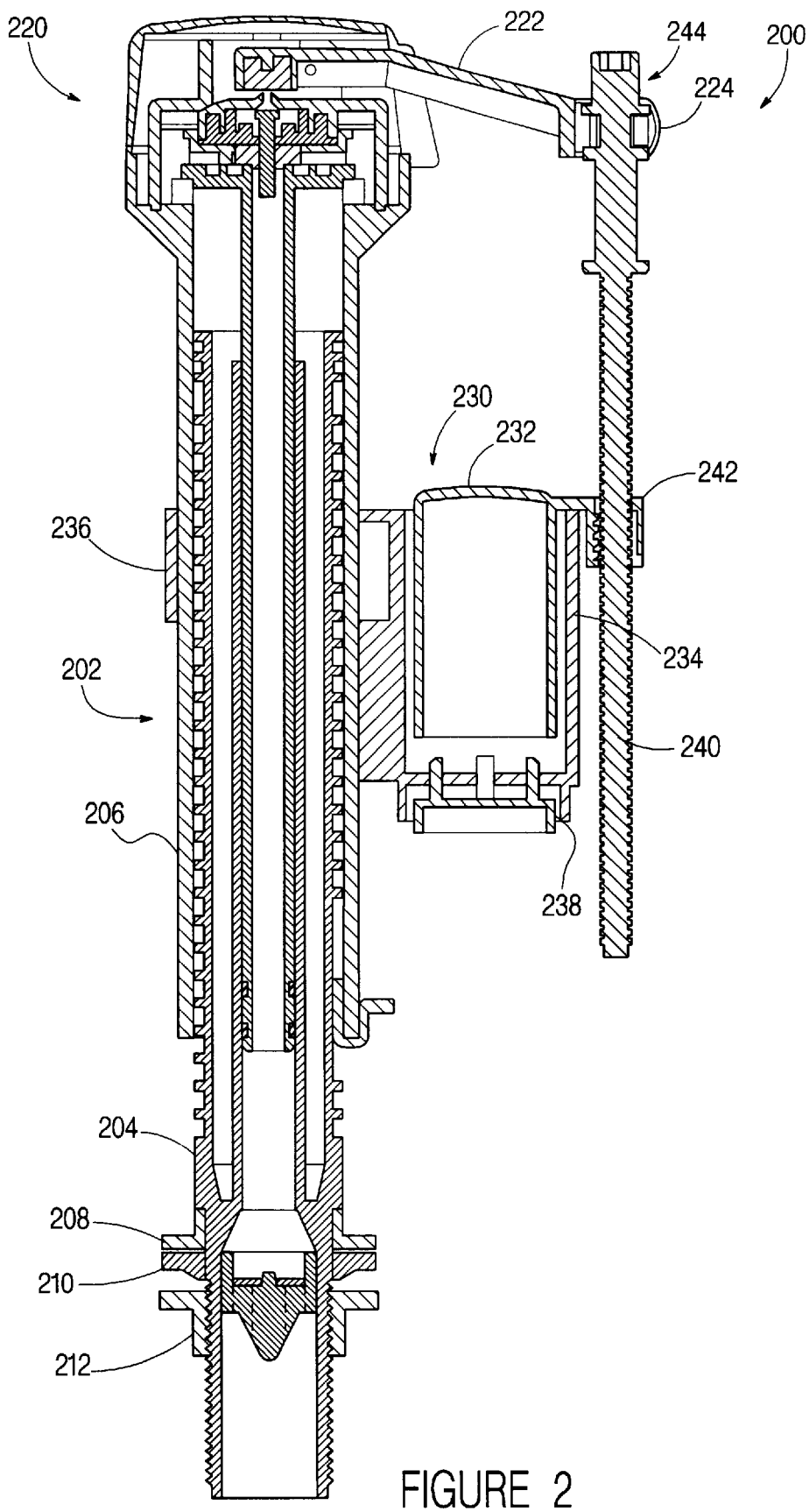
FIG. 2 is a side, cross-sectional view of an embodiment of the overall ball cock assembly of the present invention.

FIG. 2 illustrates the ball cock assembly 200 of the present invention, which includes the following major components:

a vertically-adjustable, telescoping standpipe (riser) 202;

a shutoff valve assembly 220; and a float assembly 230.

The riser 202 comprises a lower, inner tube 204 and an upper, outer tube 206. A flange 208 is disposed near the bottom of the inner tube 204. A washer (triangle pad) 210 is disposed below the flange 208. The lower extremity of the inner tube 204 is threaded for receiving a flange nut 212. A supply line (not shown; compare element 120 of FIG. 1) can be attached to the bottom end of the inner tube 204 for supplying water under pressure to the ball cock assembly 200.

The shutoff valve assembly 220 can be of conventional construction (e.g., generally according to any of the U.S. Patents cited hereinabove). A pilot actuated actuating arm 222 extends generally horizontally from the shutoff valve assembly 220, for example a distance of 10 cm therefrom, and has a distal end 224. The shutoff valve assembly includes a main valve and a float operated pilot valve.

The float assembly 230 comprises an inner float component 232, an outer float component 234, a clamp 236 for securing the outer float component 234 to the outer tube 206 of the riser 202, and a one-way valve 238 disposed at the bottom of the outer float component 234, as described in greater detail hereinbelow. An elongate connecting rod 240 extends between a flange 242 of the inner float component 232 and a yoke 244 at the distal end 224 of the actuating arm 222. As will become evident from the description that follows, the outer float component 234 is fixed to the riser 202, and does not "float", per se. Rather, it functions as a container. Only the inner float component 232 floats. It functions as a buoyant element. The cooperation of these two float components 232 and 234 with one another, and the advantages that accrue thereto, are discussed hereinbelow.

Figure 3:
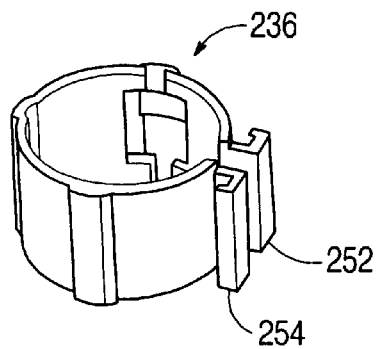
FIG. 3 is a perspective view of a clamp component of the ball cock assembly of FIG. 2.

FIG. 3 illustrates, in greater detail, the clamp 236 for securing the outer float component 234 to the outer tube 206 of the riser 202, which was shown in a side, cross-sectional view in FIG. 1. The clamp 236 is generally cylindrical, having an inside diameter which approximately equal to the outside diameter of the ouer tube 206 about which it clamps, preferably by interference fit. Rather than being a complete cylinder, however, the clamp 236 has an arcuate extent of only about 340 degrees, terminating in two opposed, spaced apart edges. Two generally L-shaped locking arms (rails) 252 and 254 extend from the edges thereof which, as will become evident, are received into corresponding slots (262, 264) on the outer float component 234. The clamp 236 is suitably formed of a plastic material.

Figure 4A:
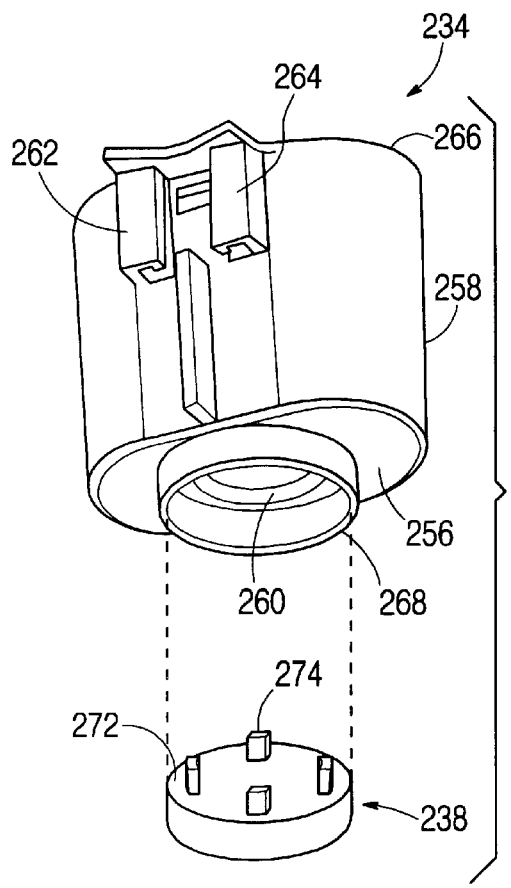
FIG. 4A is a perspective, exploded view of an outer float component of the ball cock assembly of FIG. 2.
Figure 4B:
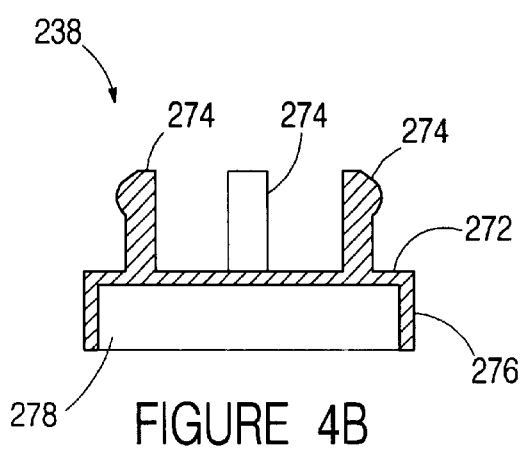
FIG. 4B is a perspective view of a one way valve for the outer float component of the ball cock assembly of FIG. 4A.

FIGS. 4A and 4B illustrate, in greater detail, the outer float component 234, which was shown in a side, cross-sectional view in FIG. 1. The outer float component 234 has the general shape and (as will become evident) will perform the function of a cup (or container)—namely, having a base (bottom) 256 and a sidewall 258 extending upwardly from the base 256. A hole 260 is disposed in the bottom of the outer float component 234, and the hole 260 may be sealed (closed) by a valve element 238 described hereinbelow. The outer float component 234 is suitably formed of a plastic material.

A pair of locking arm receiving slots 262 and 264 are formed on the exterior of the sidewall 258, near a top edge 266 thereof, for receiving the locking arms 252, 254, respectively, of the clamp 236.

A rim 268 is formed on the exterior of the base 256, and is concentric with the hole 260. The hole 260 is suitably circular, and the rim 268 is also suitably circular and has a larger diameter than the hole 260.

The valve element 238 comprises a generally planar, circular disc portion 272 having a diameter which corresponds to (e.g., is slightly less than) an inner diameter of the rim 268. Four prongs 274 extend upwardly from a surface of the disc portion 272. The prongs are arranged in two diametrically-opposed pairs, and they are all preferably disposed at the same radius from the center of the disc portion 272. The valve element 238 is suitably formed of a plastic material.

A distance between exterior surfaces of a pair of prongs 274 corresponds to (is slightly greater than) the diameter of the hole 260. The prongs 274 are resilient, and are shaped as shown in FIG. 4B, so that the valve element 238 may be loosely snap-fitted to the base 256 of the outer float component 234, with the prongs 274 extending through the hole 260.

An annular lip 276 extends downwardly from the opposite surface of the disc portion 272, and has a diameter which corresponds to (e.g., is slightly less than) an inner diameter of the rim 268. In this manner, a cavity 278 is formed on the lower surface of the valve element 238. As will be evident from a description of the function of the float assembly, the cavity 278 is an air chamber which ensures that the valve element 238 is buoyant (in water), so long as it is oriented as shown in FIG. 4B—namely, with the cavity 278 on the bottom. Alternatively (in lieu of having the cavity 278), the valve element 238 could simply be made of a buoyant material.

In this manner, the valve element 238 is loosely retained on the base 256 of the outer float component 234. When immersed in water, the valve element 238 is buoyant and closes the hole 260 in the base of the outer float component 234. When not immersed in water, water which is within the outer float component 234 can flow out the hole 260, past the valve element 238. The valve element 238 is a one-way valve functioning as a check valve.

Figure 5:
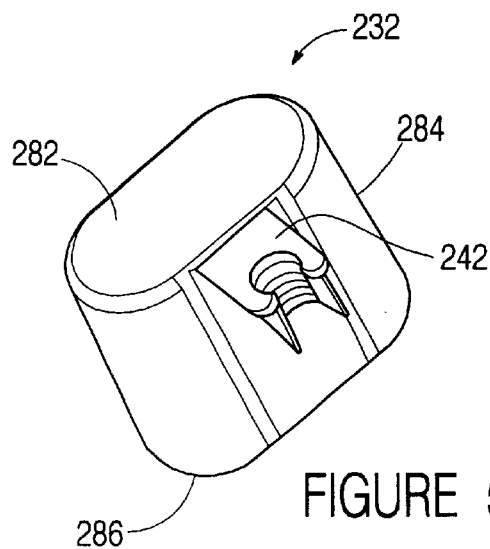
FIG. 5 is a perspective, exploded view of an inner float component of the ball cock assembly of FIG. 2.

FIG. 5 illustrated, in greater detail, the inner float component 232, which was shown in a side, cross-sectional view in FIG. 1. The inner float component 232 has the general shape and (as will become evident) function of an inverted cup—namely, having a base (bottom) 282 and a sidewall 284 extending downwardly from the base 282. The sidewall 284 has a bottom edge 286. The inner float component 232 is suitably formed of a plastic material and is watertight, and its inverted cup configuration is for trapping (containing) air so that it can function as a buoyant element. It could, alternatively be closed or, alternatively be a solid block of a buoyant material.

A flange (boss) 242 extends from an external surface of the sidewall 284 at a position near the base 282. The elongate connecting rod 240 is connected at its top end to the yoke 244 at distal end 224 of actuating arm 222, and at a selected position along the length thereof to the flange 242 inner float component 232. In this manner, the buoyant element (inner float component) 232 is "operatively connected" (by a mechanical linkage) to the shutoff valve 220 of the ball cock assembly 200.

Theory of Operation

A key feature of the outer float component 234 is that it can be disposed at a selectable fixed location (position) within the flush tank of a toilet with its top edge 266 at what is a desired water level within the tank which represents a "full" tank which is ready to be flushed.

Another key feature of the outer float component 234 is that it can function as a container having a reservoir (the space within it) which can selectively be filled with water and emptied of water.

A key feature of the inner float component 232 is that it is a buoyant element that floats in water, and that it fits within the reservoir of the outer float component 234.

Figure 6:
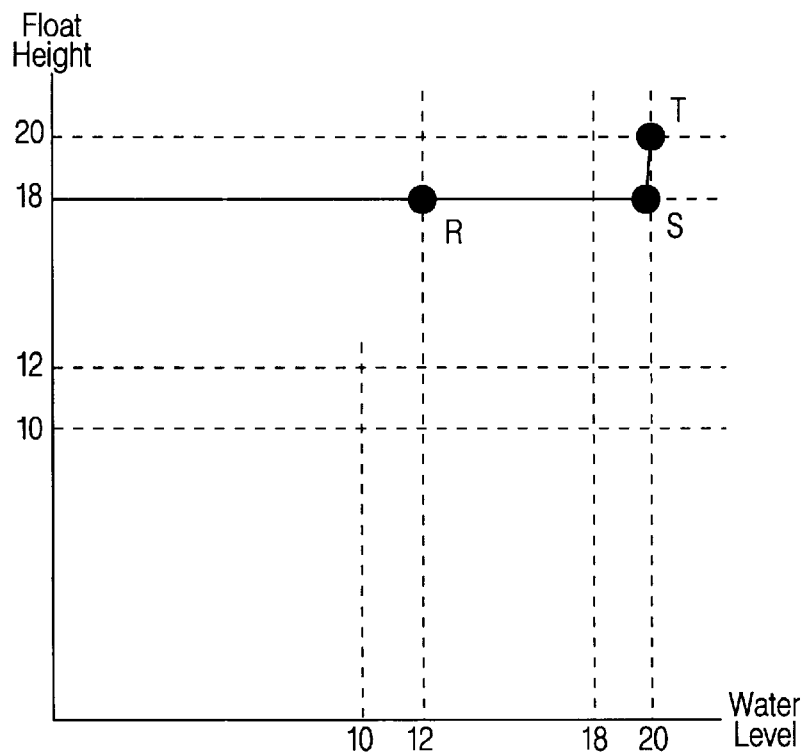
FIG. 6 is a graph illustrating the operation a buoyant element of a float assembly of the ball cock assembly of the present invention.

FIG. 6 is a graph illustrating a relationship between water level (X-axis) and float height (Y-axis) such as would be manifest with the float assembly 230 of the present invention operating a shutoff valve 220 such as described hereinabove with respect to FIG. 2. The measurements set forth herein are merely exemplary, and are taken from the bottom of the flush tank (not shown, see element 102 in FIG. 1).

In this example, the outer float component 234 is mounted (to the riser 202) so that it's top edge 266 is at the desired final water level at the end of a flush cycle. In this example, the desired water level is 20 cm, and the base 256 of the outer float component 234 is at a height of 12 cm above the bottom of the flush tank. (The position of the outer float component 234 is dependent on where the clamp 236 is secured to the standpipe.)

As best viewed in FIG. 2, the minimum excursion (lowest height) of the inner float component 232 is limited by its boss 242 resting on the top edge 266 of the outer float component 234. In this position, when the outer float component 234 is not full of water, the inner float component 232 is not floating, and its waterline is therefore below 20 cm for this example, the waterline of the inner float component is at 18 cm. In this position, with the inner float component 232 at 18 cm, the shutoff valve 220 is open.

A flush cycle commences with a full tank. The water level is 20 cm. The flush valve (not shown) is actuated and the tank empties. Water which was within the outer float component 234 drains out through the hole 260. The inner float component 232 descends, and comes to rest with its boss 242 against the top edge 266 of the outer float component 234. The shutoff valve 220 is open, and water flows into the flush tank.

Next, the flush valve closes, and the water level begins to rise within the flush tank. When the water level rises to 12 cm (see point "R"), the valve element 238 at the bottom of the outer float component 234 becomes buoyant and seals against the bottom 256 of the outer float component 234, sealing the hole 260, as described hereinabove.

As the water level rises, from 12 cm to a point ("S") just prior to 20 cm (e.g., 19.9 cm) the inner float component 232 remains "high and dry", with its boss 242 resting on the top edge 266 of the outer float component 234, with its waterline at 18 cm. In other words, for rising water levels between 12 cm ("R") which is the level at which the water first comes into contact with the float assembly 230 and 19.9 cm ("S") which is just prior to the water reaching the top edge 266 of the outer float component 234, the inner float component 232 does not rise in concert with the rising water level. As a matter of fact, it does not rise at all.

When the water level rises to 20 cm, as indicated by the point "T", it spills over the top edge 266 of the outer float component 234, rapidly filling the outer float component 234. When this happens, the inner float component 232 is suddenly immersed in water, and abruptly becomes buoyant, "popping up" like an air-filled sack which has been tethered underwater. According to basic buoyant principles, the inner float component 232 will, at this point, substantially immediately rise to 20 cm. Its waterline will be at the water level. This all happens rather quickly (e.g., within one second) substantially at a single water level—in this example, at 20 cm. (In the graph of FIG. 6, the point "S" is shown at a slightly lower water level than the point "T", for illustrative clarity.) This substantially instantaneous filling of the reservoir of the outer float component 234 is enabled by the fact that the volume of water in the flush tank (102) is much greater than (>>) the volume of the interior (water reservoir) of the outer float component.

Referring back to FIG. 1A, a conventional float assembly has a buoyant element (e.g., 130) which, within its range of buoyant movement, rises in concert with, at the same rate as, in a 1:1 relationship with, the rise in water level.

In contrast thereto, the inventive float assembly 230 has a buoyant element 232 which is caused to rise at a rate "R1" which is greater than, such as more than twice, a rate "R2" at which the water is rising in the tank. (R1>c*R2; where c=1,2,3,4,5,6,7,8,9,10).

This disparity in rates (R1 and R2) is accomplished by disposing the buoyant element (232) within a container (234) which is suddenly (substantially instantaneously) filled with water 30 when the water entering the flush tank rises to a selected level (e.g., the exemplary 20 cm described hereinabove) and spills over the top edge (266) of the container (234) into the reservoir of the container (234).

When the toilet is subsequently flushed, the water level drops quickly. Starting from a water level of 20 cm, when the water level reaches just below 12 cm (which is the height of the bottom 256 of the outer float component 234), the valve 238 will open, thereby allowing the outer float component 234 to drain and the inner float component 232 to come to rest on the top edge 266 of the outer float component 234.

As is graphically illustrated by a side-by-side comparison of FIG. 1A and FIG. 6, the buoyant element (232) of the present invention (FIG. 6) moves in manner which is more distinct, more determinate, more precise than the gradual motion experienced by the buoyant element (130) of the prior art (FIG. 1).

This increased rate and abrupt rise of the buoyant element 232 has beneficial effects because it occurs specifically when the water level is reaching (has reached) the prescribed level at which it is desired to shut off the incoming water by operating the shutoff valve 220. Additionally, all other things being equal (e.g., for a given buoyant element exerting a given buoyant force), the force exerted by the buoyant element of the present invention is delivered in a much shorter interval of time, thereby effectively being more "powerful".

Additional Features

Figure 7:
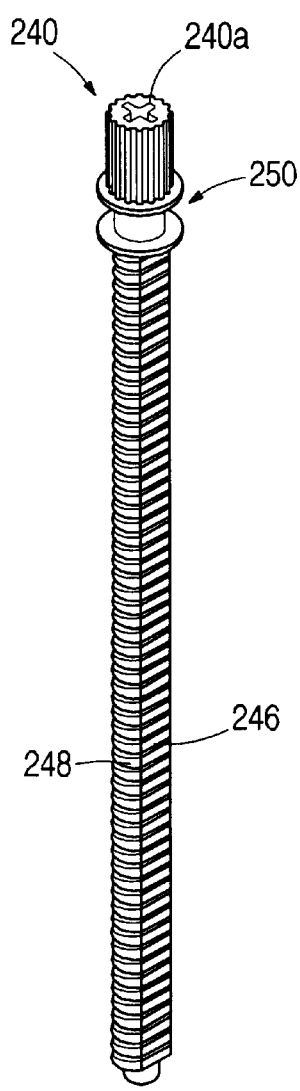
FIG. 7 is a perspective view of a connecting rod component of the ball cock assembly of FIG. 2.

FIG. 7 is a perspective view of the connecting rod 240 which was shown in side cross-section in FIG. 1. The connecting rod 240 is essentially an elongate, threaded rod having a top end 240a and a bottom end 240b. It is threaded along most of its length from the bottom end 240b towards the top end 240a. However, rather than having threads extending completely around its circumference, it has two opposed flat surfaces 246, and two opposed threaded surfaces 248. Hence, it is narrower across the flat surfaces than across the threaded surfaces.

As best viewed in FIG. 5, the flange 242 on the inner float component 232 is provided with a vertically-extending notch which is generally C-shaped and is sized to extend only about 200-degrees about the circumference of the connecting rod 24, so that it can selectively engage the connecting rod 240. The interior surface of the flange is internaly threaded, or serrated. In this manner, the connecting rod 240 can be disengaged from the flange 242 by rotating the connecting rod 240 so that its threaded surfaces 248 are aligned towards and away from the standpipe 202. By snapping the rod 240 into the notch of the flange 242, and rotating the rod so its threads engage the corresponding threads of the flange, the position along the rod at which the inner float component 232 can be connected to the rod is readily established, or re-established as may be required.

Figure 8:
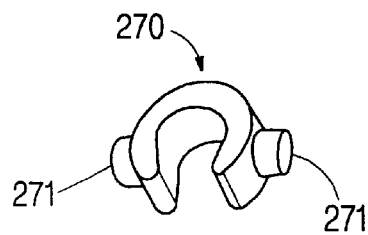
FIG. 8 is a perspective view of a link component of the ball cock assembly of FIG. 2.

FIG. 8 is a perspective view of a link 270 fitting into a yoke at the distal end 224 of the actuating arm 222. It is also generally C-shaped, and is sized to receive the upper end of the connecting rod 240 in an annular groove 250 thereof. The link 270 is provided with two trunnions 271, 180 degrees apart from one another, so that the link 270 can pivot, allowing the connecting rod 240 to be manipulated out of engagement with the flange 242.

Figure 9:
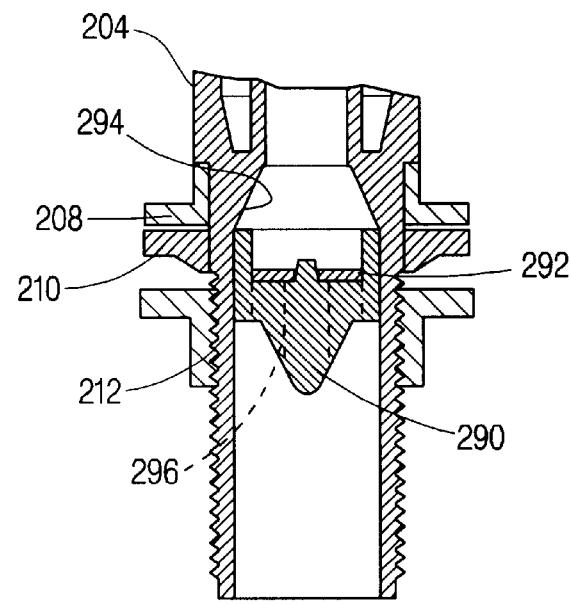
FIG. 9 is an enlarged cross-sectional view of a bottom portion of the standpipe component of the ball cock assembly of FIG. 2, illustrating an anti-siphon feature.
Figure 9A:
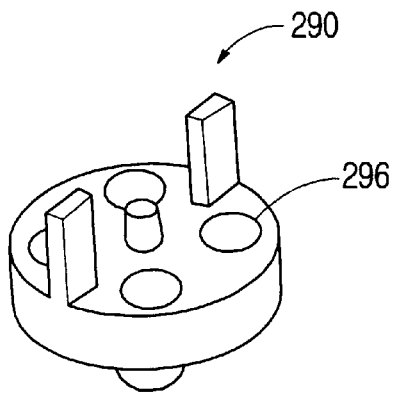
FIG. 9A is a perspective view of a poppet component of the anti-siphon feature of FIG. 9.
Figure 9B:
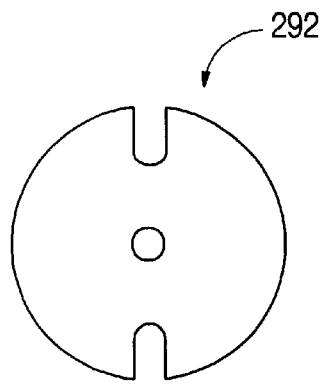
FIG. 9B is a plan view of a seal component of the anti-siphon feature of FIG. 9.

FIGS. 9, 9A and 9B illustrate an anti-siphon feature for the ball cock assembly (200). The anti-siphon feature comprises a poppet 290 and a seal 292 and an appropriately sized and shaped inside surface 294 of a bottom end portion of the lower tube 204 of the standpipe 202. When water pressure is present at the bottom end of the lower tube 204, the poppet 290 moves up, and water flows past the poppet 290. In the event of a loss of water pressure from the supply line (120), the poppet 290 rests against a valve seat (with the seal 292 therebetween), thereby preventing water from the flush tank from flowing through the standpipe 202 into the supply line. In this manner, the anti-siphon feature 290 functions as a check valve, allowing water to flow from the supply line into the standpipe, and preventing water from flowing from the standpipe into the supply line.

In addition, as shown in FIGS. 9 and 9A, the poppet 290 includes a plurality of through holes 296 (which regulate the flow rate across the poppet).

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. A method of controlling water level in a lush tank of a toilet comprising the steps of:
   controlling the supply of water to the flush tank with a main valve mounted atop a riser;
   controlling the opening and closing of the main valve with a pilot valve;
   controlling the water level in the flush tank by attaching a container with a buoyant element disposed therein to the riser at a selectable, fixed position: and
   adjustably connecting the buoyant element to an arm portion of the pilot valve relative to an interior of the container so that when the water rises to a selected level in the flush tank, the container is suddenly filled with water when the water reaches a top edge of the container, causing the buoyant element to abruptly rise in the container and shut the pilot valve so that the main valve is closed.

2. Method, according to claim 1, including the step of:
   controlling the water level by locating the top edge of the container at the selected water level.

3. Method, according to claim 1, wherein:
   the rate at which the buoyant element rises is greater than twice the rate at which the water is rising in the tank.

4. An assembly for controlling the water level in a flush tank of a toilet, comprising:
   a main valve mounted a top a riser for controlling the supply of water to the flush tank;
   a pilot valve for controlling the opening and closing of the main valve;
   a container with a buoyant element disposed therein attached to the riser at a selectable, fixed position for controlling the water level in the flush tank;
   means for allowing the water to enter the container when the water reaches a first specified level;
   means for allowing the water to drain from the container when the water drops below a second specified level;
   means for adjustably connecting the buoyant element to an arm portion of the pilot valve relative to an interior of the container so that when the water when rises to the first specified level in the flush tank, the container is suddenly filled with water when water reaches a top edge of the container, causing the buoyant element to abruptly rise in the container and shut the pilot valve so that the main valve is closed.

5. The assembly according to claim 4, wherein:
   the container is attached to the riser with a clamp fitting around the riser.

6. The assembly according to claim 4, wherein:
   the container is formed by a base and sidewall extending upwardly from the base and the top edge.

7. The assembly according to claim 4, wherein:
   the means for allowing water to drain from the container when the water drops below a second specified level is a one-way valve disposed in the base of the container.

8. The assembly according to claim 4, wherein:
   the container is formed of a plastic material.

9. The assembly according to claim 4, wherein:
   the container is shaped like a cup.

10. The assembly according to claim 4, wherein:
    the buoyant element is formed of a plastic material.

11. The assembly according to claim 4, wherein:
    the buoyant element has an inverted cup configuration.

12. The assembly according to claim 4, wherein:
    the means for allowing the water to drains is formed of a plastic material.

13. The assembly according to claim 4, wherein:
    the means for allowing the water to drain is buoyant.

14. The assembly according to claim 4, wherein:
    the container is shaped as a cup; and
    the buoyant element has an inverted cup configuration.

* * * * *